US012725994B2

(12) United States Patent
Kitahara

(10) Patent No.: US 12,725,994 B2
(45) Date of Patent: Sep. 1, 2026

(54) RARE-EARTH DOPED FIBER AND FIBER LASER APPARATUS

(71) Applicant: Fujikura Ltd., Tokyo (JP)

(72) Inventor: Rintaro Kitahara, Sakura (JP)

(73) Assignee: Fujikura Ltd., Tokyo (JP)

( * ) Notice: Subject to any disclaimer, the term of this patent is extended or adjusted under 35 U.S.C. 154(b) by 679 days.

(21) Appl. No.: 18/270,785

(22) PCT Filed: Aug. 24, 2021

(86) PCT No.: PCT/JP2021/030977

§ 371 (c)(1),
(2) Date: Jul. 3, 2023

(87) PCT Pub. No.: WO2022/162985

PCT Pub. Date: Aug. 4, 2022

(65) Prior Publication Data

US 2024/0079840 A1 Mar. 7, 2024

(30) Foreign Application Priority Data

Feb. 1, 2021 (JP) ................................. 2021-014119

(51) Int. Cl.
*H01S 3/067* (2006.01)
*H01S 3/16* (2006.01)

(52) U.S. Cl.
CPC ........ *H01S 3/06716* (2013.01); *H01S 3/0675* (2013.01); *H01S 3/1618* (2013.01); *H01S 3/06733* (2013.01); *H01S 2301/03* (2013.01)

(58) Field of Classification Search
None
See application file for complete search history.

(56) References Cited

U.S. PATENT DOCUMENTS 5,778,129 A * 7/1998 Shukunami ......... H01S 3/06708 385/127
11,462,878 B2 * 10/2022 Pax ..................... H01S 3/08045
(Continued)

FOREIGN PATENT DOCUMENTS

CN 110603694 A 12/2019
WO 2003067723 A1 8/2003
(Continued)

OTHER PUBLICATIONS

Simplified expression for transverse mode instability threshold in high power fiber lasers; Optics express, vol. 32, No. 4/12, Feb. 2024 (Year: 2024).*
(Continued)

*Primary Examiner* — Tod T Van Roy
(74) *Attorney, Agent, or Firm* — Osha Bergman Watanabe & Burton LLP

(57) ABSTRACT

A rare-earth doped fiber includes: a core having a radius R and having a doped region to which a rare-earth element has been doped, the doped region ranging from a center of the core to a radius $R_{re}$; and a cladding surrounding a circumference of the core and having a refractive index lower than a refractive index of the core. A normalized frequency V at an operating wavelength is greater than or equal to 2.4 and less than or equal to 4.5. The radius $R_{re}$ is in a range of $0<R_{re}<$ $$(0.0247V^2 - 0.3353V + 1.6474)R.$$

10 Claims, 8 Drawing Sheets

(56) References Cited

U.S. PATENT DOCUMENTS

| | | | | |
|---|---|---|---|---|
| 11,901,690 | B2 * | 2/2024 | Nakanishi | H01S 3/08045 |
| 12,072,521 | B2 * | 8/2024 | Dragic | H01S 3/06716 |
| 12,519,279 | B2 * | 1/2026 | Roy | H01S 3/06716 |
| 2011/0075252 | A1 | 3/2011 | Frith | |
| 2012/0262780 | A1 | 10/2012 | Bai et al. | |
| 2015/0280388 | A1 | 10/2015 | Kashiwagi | |
| 2016/0043525 | A1 | 2/2016 | Ichige et al. | |
| 2018/0203186 | A1 | 7/2018 | Kitahara | |
| 2020/0161826 | A1 | 5/2020 | Mimuro | |
| 2020/0225407 | A1 | 7/2020 | Urushibara et al. | |
| 2020/0358245 | A1 * | 11/2020 | Hasegawa | H01S 3/06716 |
| 2022/0190543 | A1 | 6/2022 | Nishimura et al. | |
| 2022/0271494 | A1 * | 8/2022 | Hosokawa | H01S 3/06729 |
| 2023/0042363 | A1 * | 2/2023 | Shima | H01S 3/091 |
| 2023/0402808 | A1 * | 12/2023 | Roy | H01S 3/06716 |
| 2024/0079840 | A1 * | 3/2024 | Kitahara | H01S 3/06716 |
| 2024/0258759 | A1 * | 8/2024 | Nishimura | H01S 3/094011 |

FOREIGN PATENT DOCUMENTS

| | | | |
|---|---|---|---|
| WO | 2018003184 | A1 | 1/2018 |
| WO | 2019026906 | A1 | 2/2019 |
| WO | 2020203930 | A1 | 10/2020 |

OTHER PUBLICATIONS

Transverse mode instability mitigation in a high-power confined doped fiber amplifier with good beam quality through seed laser control; High Power Laser Science and Engineering, (2022), vol. 10, e44, 10 pages. (Year: 2022).*

Extended European Search Report issued in corresponding European Patent Application No. 21922993.7, dated Dec. 3, 2024 (6 pages).

Eidam, Tino, et al., "Experimental observations of the threshold-like onset of mode instabilities in high power fiber amplifiers," Optics Express, vol. 19, No. 4, 13218-13224, Jul. 4, 2011 (7 pages).

* cited by examiner

RARE-EARTH DOPED FIBER AND FIBER LASER APPARATUS

CROSS-REFERENCE TO RELATED APPLICATIONS

This application claims the benefit of priority from Japanese Patent Application No. 2021-014119, filed on Feb. 1, 2021, the disclosure of which is incorporated herein in its entirety by reference.

TECHNICAL FIELD

The present invention relates to a rare-earth doped fiber and a fiber laser apparatus, and more particularly to a rare-earth doped fiber used in a fiber laser apparatus.

BACKGROUND

A fiber laser apparatus has been used in a wide variety of applications including laser processing applications and medical applications because it has better light focusing capability, can output light having a higher power density, and can implement smaller beam spots as compared to conventional laser devices. Demands for high-power laser have grown in recent years. Thus, an output of a fiber laser apparatus has also been increased. As an output of a fiber laser apparatus is increased, light propagating through optical fibers within the fiber laser apparatus has an increased power density, so that wavelength conversion of light is likely to be caused by stimulated Raman scattering. When such stimulated Raman scattering is caused, an output of light having a wavelength to be amplified in design may be lowered, resulting in an unstable output of the fiber laser apparatus. Optical components such as fiber Bragg gratings (FBGs) used in fiber laser devices do not satisfactorily function for light having wavelengths other than intended wavelengths. Therefore, if wavelength conversion of light occurs more frequently due to stimulated Raman scattering, then functions of those optical components may be impaired to cause a failure of a fiber laser device. In a high-power fiber laser apparatus, therefore, a multimode fiber having an increased core diameter has been used to lower a power density of light propagating through the optical fiber so as to prevent wavelength conversion of light from occurring due to stimulated Raman scattering.

It has been known that a phenomenon called transverse mode instability (TMI) occurs if an optical power exceeds a certain threshold in a case where a multimode fiber is used as a rare-earth doped fiber for use in a fiber laser device. With the TMI phenomenon, periodical refractive index fluctuations are produced in a rare-earth doped fiber depending on a difference between propagation constants of the fundamental mode and a higher-order mode.

It is conceivable that the TMI phenomenon occurs with the following process. When multiple modes propagate through a rare-earth doped fiber, interference happens between those modes. During laser oscillation, stimulated emission occurs more actively at a portion of a rare-earth doped fiber where constructive interference happens. Conversely, less stimulated emission occurs at a portion of the rare-earth doped fiber where destructive interference happens. When stimulated emission occurs, a certain amount of heat is produced by quantum defects. Therefore, a heat distribution is generated in a longitudinal direction depending on interference periods between modes, resulting in periodical refractive index fluctuations.

When such a TMI phenomenon occurs, periodical refractive index fluctuations along a longitudinal direction serve as a long-period grating. Thus, mode-coupling may occur between the fundamental mode and a higher-order mode. Such mode-coupling degrades beam quality of an output laser beam and impairs light focusing capability, which is one of advantages of a fiber laser apparatus as described above. For example, Non-Patent Literature 1 describes that beam quality is drastically degraded when an optical power exceeds a certain threshold.

Non-Patent Literature 1: T. Eidam, C. Wirth, C. Jauregui, F. Stutzki, F. Jansen, H.-J. Otto, O. Schmidt, T. Schreiber, J. Limpert, and A. Tunnermann, "Experimental observations of the threshold-like onset of mode instabilities in high power fiber amplifiers," Optics express 19, 13218-13224 (2011).

SUMMARY

One or more embodiments of the present invention provide a rare-earth doped fiber capable of suppressing mode-coupling between a fundamental mode and a higher-order mode when light transmits through a long-period grating produced by a TMI phenomenon.

Furthermore, one or more embodiments of the present invention provide a fiber laser apparatus capable of suppressing degradation of beam quality of an output laser beam.

According to one or more embodiments of the present invention, there is provided a rare-earth doped fiber capable of suppressing mode-coupling between a fundamental mode and a higher-order mode when light transmits through a long-period grating produced by a TMI phenomenon. This rare-earth doped fiber has a core having a radius R and a cladding surrounding a circumference of the core and having a refractive index lower than a refractive index of the core. A rare-earth element has been doped to a doped region ranging from a center of the core to a radius $R_{re}$. A normalized frequency V of the rare-earth doped fiber at an operating wavelength is greater than or equal to 2.4 and less than or equal to 4.5, and 0<

$$R_{re} < (0.0247V^2 - 0.3353V + 1.6474)R.$$

According to one or more embodiments of the present invention, there is provided a fiber laser apparatus capable of suppressing degradation of beam quality of an output laser beam. This fiber laser apparatus has the aforementioned rare-earth doped fiber and at least one pumping light source operable to generate pumping light for exciting the rare-earth element doped to the rare-earth doped fiber and provide the pumping light to the rare-earth doped fiber.

DETAILED DESCRIPTION

Figure 1:
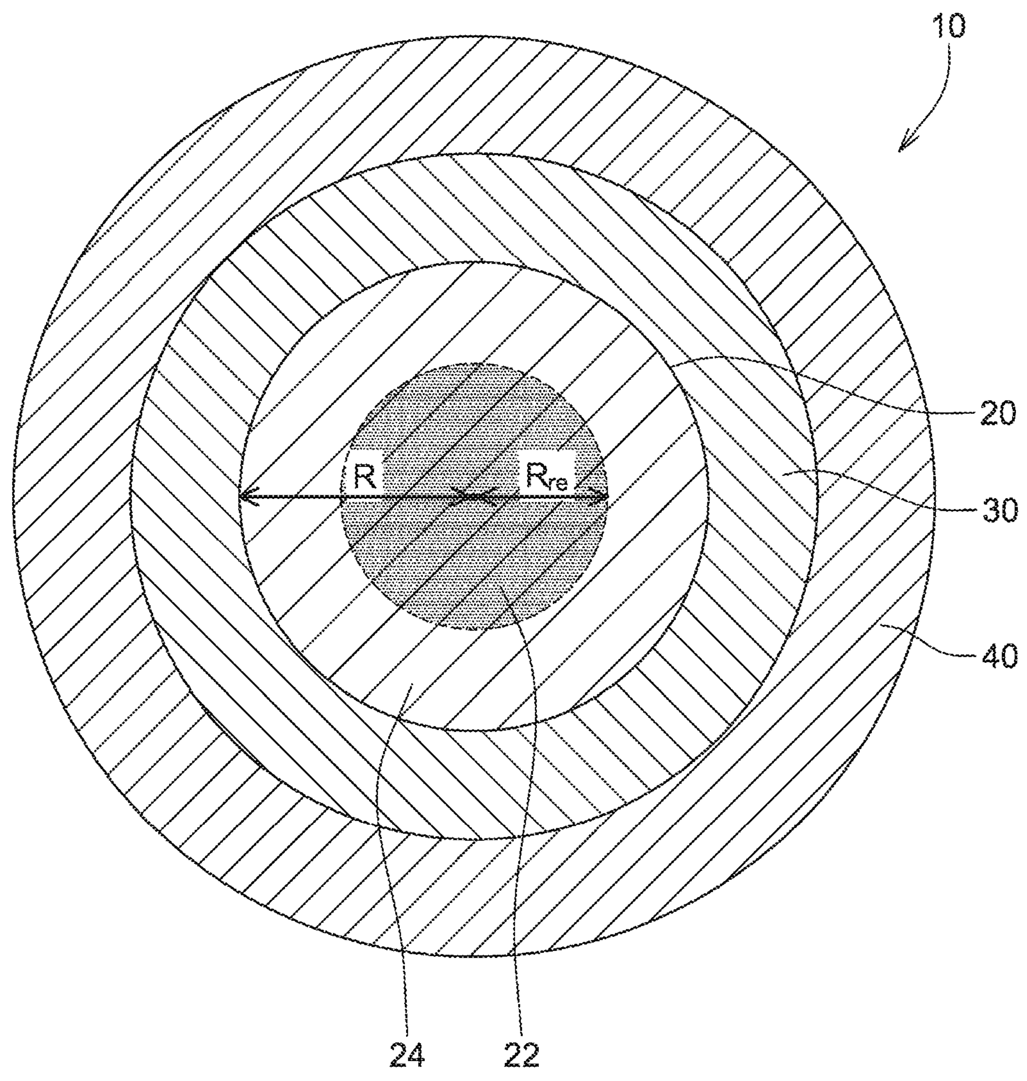
FIG. 1 is a diagram schematically showing a cross-section of a rare-earth doped fiber according to one or more embodiments of the present invention.
Figure 2A:
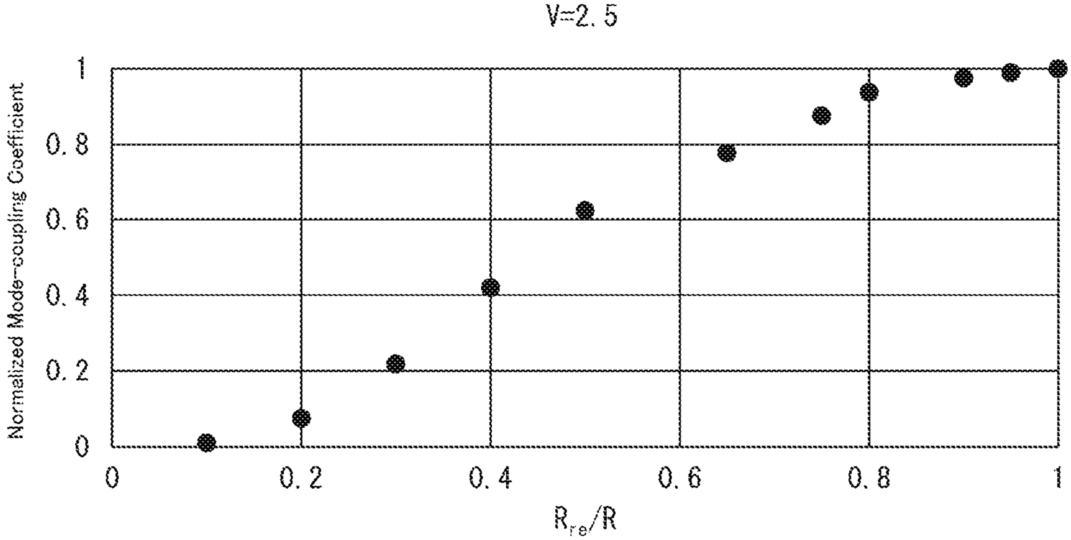
FIG. 2A is a graph showing a relationship between a doped region of a rare-earth element and a normalized mode-coupling coefficient between an LP01 mode and an LP11 mode in a case where a normalized frequency V of an optical fiber is 2.5.
Figure 2B:
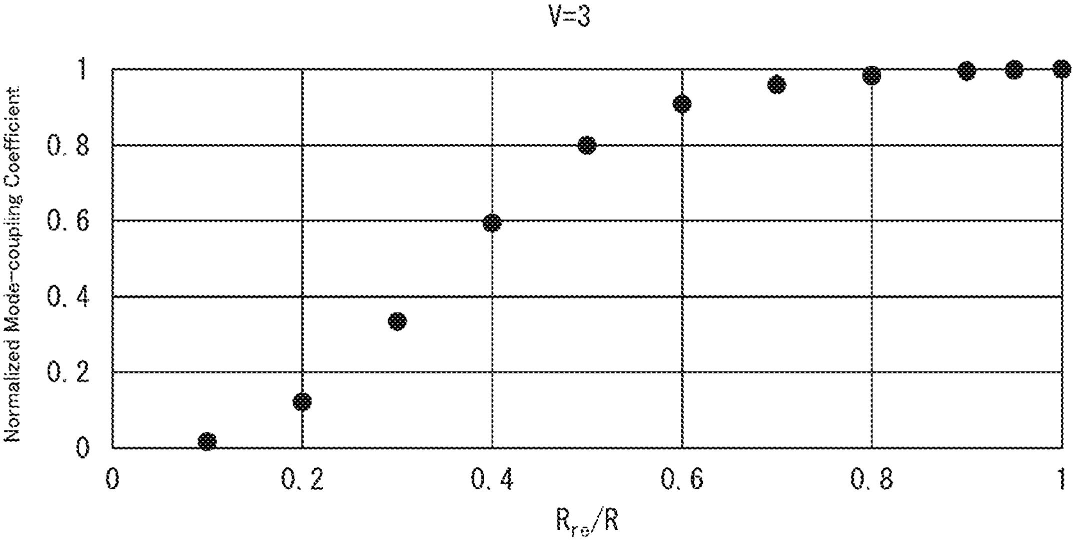
FIG. 2B is a graph showing a relationship between a doped region of a rare-earth element and a normalized mode-coupling coefficient between an LP01 mode and an LP11 mode in a case where a normalized frequency V of an optical fiber is 3.
Figure 2C:
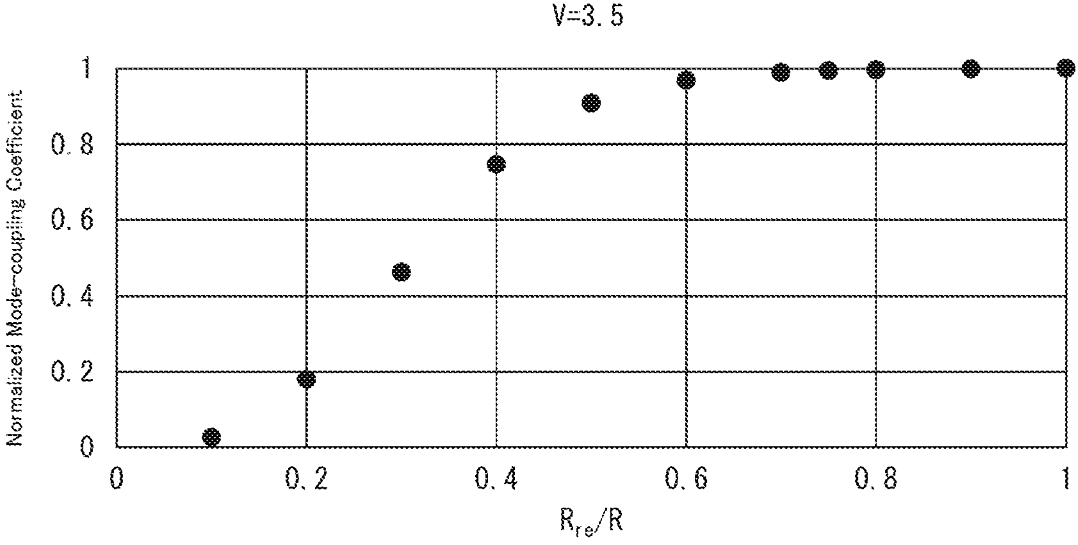
FIG. 2C is a graph showing a relationship between a doped region of a rare-earth element and a normalized mode-coupling coefficient between an LP01 mode and an LP11 mode in a case where a normalized frequency V of an optical fiber is 3.5.
Figure 2D:
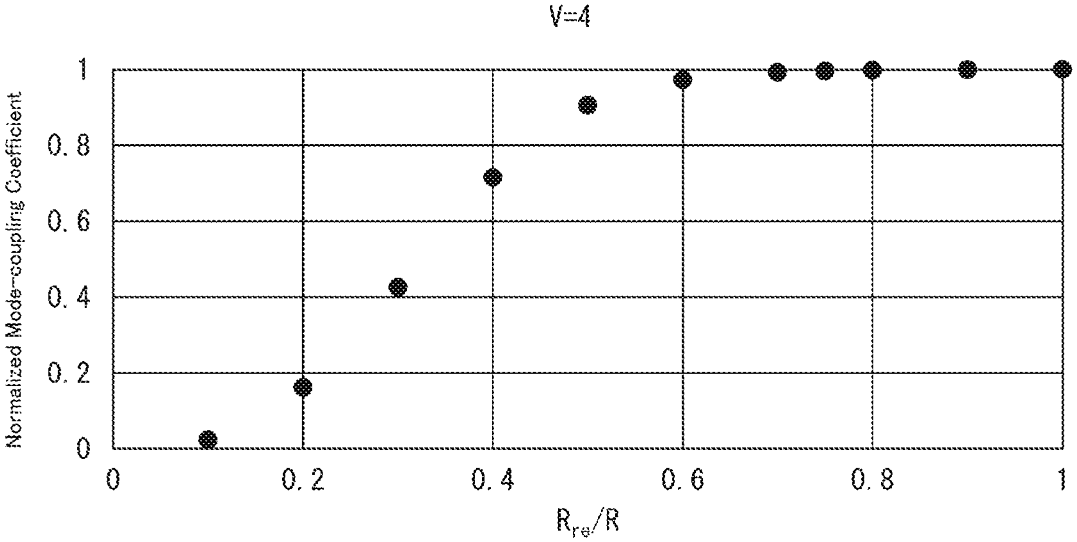
FIG. 2D is a graph showing a relationship between a doped region of a rare-earth element and a normalized mode-coupling coefficient between an LP01 mode and an LP11 mode in a case where a normalized frequency V of an optical fiber is 4.
Figure 2E:
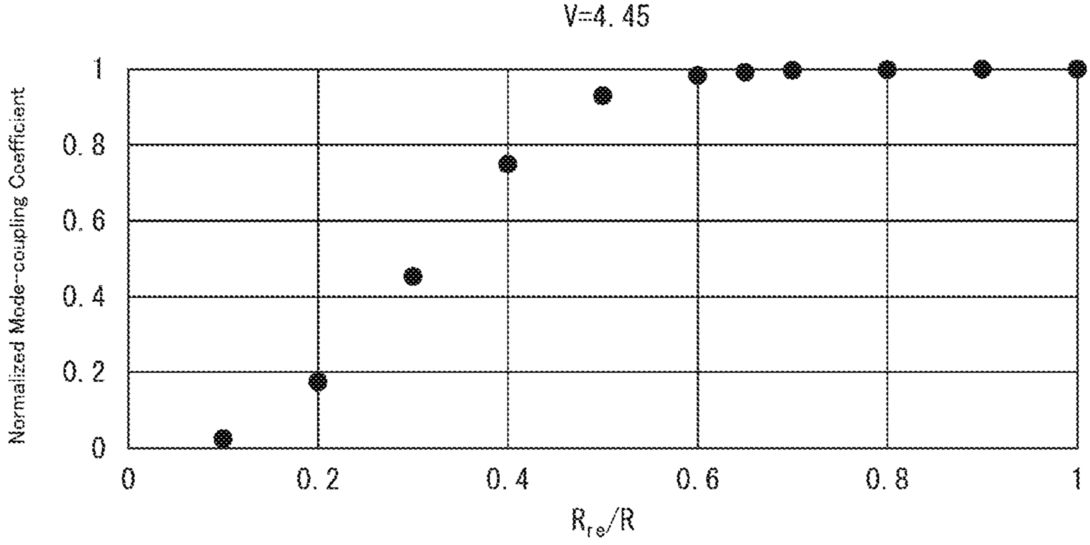
FIG. 2E is a graph showing a relationship between a doped region of a rare-earth element and a normalized mode-coupling coefficient between an LP01 mode and an LP11 mode in a case where a normalized frequency V of an optical fiber is 4.45.

Embodiments of a rare-earth doped fiber and a fiber laser apparatus according to the present invention will be described in detail below with reference to FIGS. 1 to 8. In FIGS. 1 to 8, the same or corresponding components are denoted by the same or corresponding reference numerals and will not be described below repetitively. Furthermore, in FIGS. 1 to 8, the scales or dimensions of components may be exaggerated, or some components may be omitted. Unless mentioned otherwise, in the following description, terms such as "first," "second," etc. are only used to distinguish one component from another and are not used to indicate a specific order or a specific sequence.

FIG. 1 is a diagram schematically showing a cross-section of a rare-earth doped fiber 10 according to one or more embodiments of the present invention. As shown in FIG. 1, the rare-earth doped fiber 10 includes a core 20 having a radius R, an inner cladding 30 surrounding a circumference of the core 20, and an outer cladding 40 surrounding a circumference of the inner cladding 30. A refractive index of the inner cladding 30 is lower than a refractive index of the core 20. A refractive index of the outer cladding 40 is lower than a refractive index of the inner cladding 30. The one or more embodiments describe an example in which the rare-earth doped fiber 10 is provided as a double-cladding fiber having two claddings. However, the present invention is not limited to this example. The rare-earth doped fiber 10 may have a single cladding layer or three or more cladding layers.

For example, the rare-earth doped fiber 10 is used as an amplification optical fiber for a fiber laser apparatus. The rare-earth doped fiber 10 includes a doped region 22 to which a rare-earth element such as ytterbium (Yb), erbium (Er), thulium (Tr), or neodymium (Nd) has been doped and a non-doped region 24 to which no rare-earth element has been doped. The doped region 22 ranges from the center of the core 20 to a radius $R_{re}$ ($0<R_{re}<R$). The inventors have found that mode-coupling in the rare-earth doped fiber 10 can be suppressed when the radius $R_{re}$ of the doped region 22 in the rare-earth doped fiber 10 is designed in the following manner.

Generally, a mode-coupling coefficient κ of a long-period grating is expressed by the following formula (1). A smaller mode-coupling coefficient κ reduces transition of optical power between modes. In other words, mode-coupling is suppressed with a smaller mode-coupling coefficient κ.

$$\kappa \propto \int_{-\infty}^{\infty}\int_{-\infty}^{\infty} \Delta n E_{FM} E_{HOM}\, dx dy \tag{1}$$

In the above formula, x and y represent two-dimensional coordinates in a cross-section perpendicular to an optical axis of an optical fiber, Δn an amplitude of refractive index fluctuations in a longitudinal direction, and $E_{FM}$ and $E_{HOM}$ electric field distributions of the fundamental mode and a higher-order mode, respectively.

As described above, refractive index fluctuations caused by a TMI phenomenon result from heat generation due to quantum defects. Quantum defects may be produced in a region to which a rare-earth element has been doped. Therefore, the inventors assumed that the aforementioned refractive index fluctuations are caused in a region of an optical fiber to which a rare-earth element has been doped. Thus, Δn in the above formula (1) was replaced with a doping distribution of a rare-earth element, and mode-coupling coefficients κ between an LP01 mode and an LP11 mode in a case where a rare-earth element has been doped to the doped region 22 of the core 20 in the rare-earth doped fiber 10 were calculated at different normalized frequencies V. The results are shown in FIGS. 2A-2E. In FIGS. 2A-2E, the horizontal axis represents a value of $R_{re}/R$, i.e., the radius $R_{re}$ of the doped region 22 that is normalized by the radius R of the core. The vertical axis represents the calculated mode-coupling coefficient κ normalized by a mode-coupling coefficient in a case where $R_{re}/R=1$ (normalized mode-coupling coefficient). FIGS. 2A, 2B, 2C, 2D, and 2E show normalized mode-coupling coefficients in cases where V=2.5, V=3, V=3.5, V=4, and V=4.45, respectively.

It can be seen from FIGS. 2A-2E that a normalized mode-coupling coefficient between the LP01 mode and the LP11 mode increases as the radius $R_{re}$ of the doped region 22 is reduced. At each of the normalized frequencies V, $R_{re}$ from which the normalized mode-coupling coefficient becomes smaller than 1 is defined by $R'_{re}$.

$$R'_{re}/R = 0.95 \text{ when } V = 2.5.$$

$$R'_{re}/R = 0.9 \text{ when } V = 3.$$

$$R'_{re}/R = 0.75 \text{ when } V = 3.5.$$

$$R'_{re}/R = 0.7 \text{ when } V = 4.$$

$$R'_{re}/R = 0.65 \text{ when } V = 4.45.$$

Figure 3:
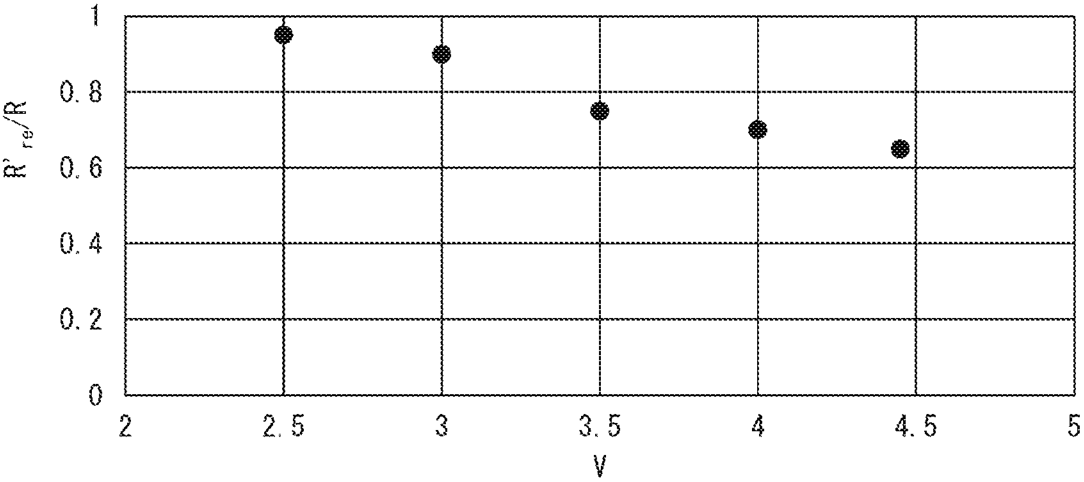
FIG. 3 is a graph showing when normalized mode-coupling coefficients between an LP01 mode and an LP11 mode at the respective normalized frequencies V begin to decrease below 1.

Those results are graphed in FIG. 3. It can be seen from FIG. 3 that, if a normalized frequency V increases, the normalized mode-coupling coefficient cannot be made less than 1 unless the radius $R_{re}$ of the doped region 22 is reduced.

Meanwhile, when the values of $R'_{re}/R$ shown in FIG. 3 are fitted into a quadratic function, the following formula (2) is found.

$$\frac{R'_{re}}{R} = (0.0247V^2 - 0.3353V + 1.6474) \tag{2}$$

Therefore, the normalized mode-coupling coefficient can be made less than 1 when the radius $R_{re}$ of the doped region 22 is set to be greater than $R'_{re}$ defined by the above formula (2). In other words, if the radius $R_{re}$ of the doped region 22 is set to satisfy $$0 < R_{re} < (0.0247V^2 - 0.3353V + 1.6474)R, \tag{3}$$

then mode-coupling from the LP01 mode to the LP11 mode can be suppressed as compared to a case where a rare-earth element has been doped to the entire region of the core 20 (the normalized mode-coupling coefficient is 1).

Figure 4A:
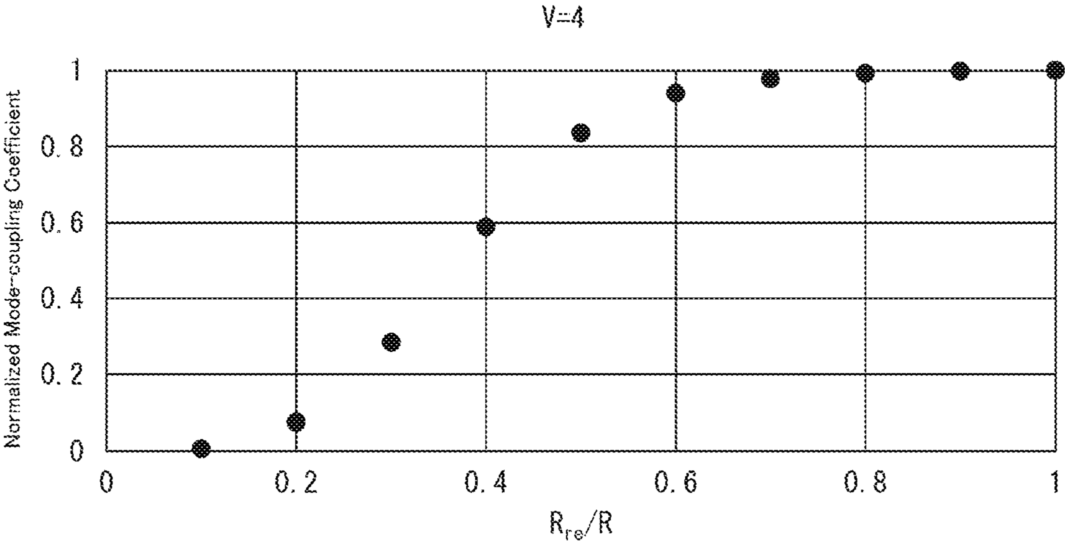
FIG. 4A is a graph showing a relationship between a doped region of a rare-earth element and a normalized mode-coupling coefficient between an LP01 mode and an LP21 mode in a case where a normalized frequency V of an optical fiber is 4.
Figure 4B:
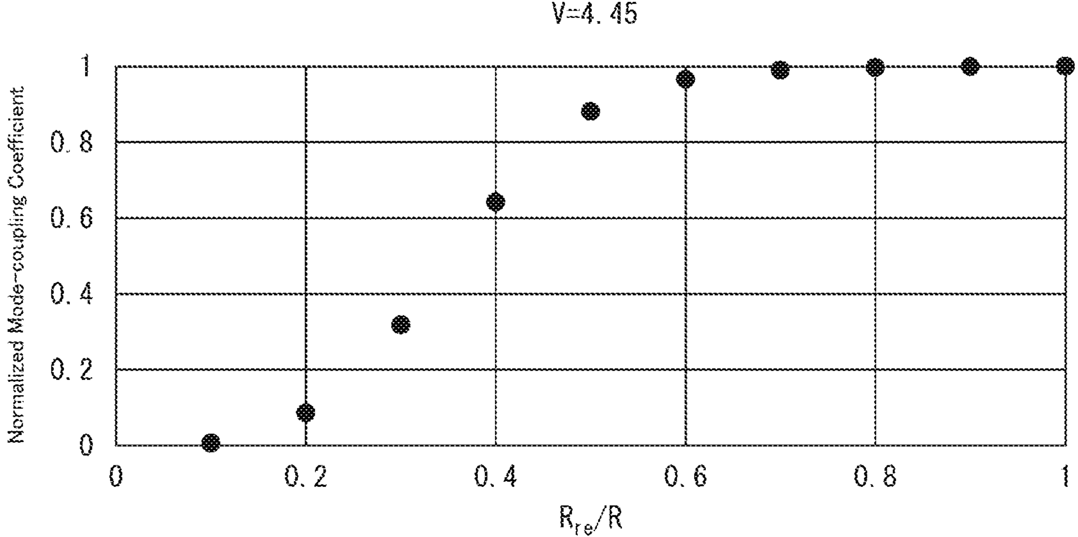
FIG. 4B is a graph showing a relationship between a doped region of a rare-earth element and a normalized mode-coupling coefficient between an LP01 mode and an LP21 mode in a case where a normalized frequency V of an optical fiber is 4.45.

Similarly, normalized mode-coupling coefficients between the LP01 mode and the LP21 mode are calculated as shown in FIGS. 4A and 4B. FIG. 4A shows normalized mode-coupling coefficients where V=4, and FIG. 4B shows normalized mode-coupling coefficients where V=4.45. As seen from FIGS. 4A and 4B, normalized mode-coupling coefficients between the LP01 mode and the LP21 mode exhibit a tendency similar to that of normalized mode-coupling coefficients between the LP01 mode and the LP11 mode as illustrated in FIGS. 2A-2E. Furthermore, as seen from comparison between FIG. 4A and FIG. 2D and between FIG. 4B and FIG. 2E, when the doped region 22 has the same radius $R_{re}$, the normalized mode-coupling coefficients between the LP01 mode and the LP21 mode are smaller than the normalized mode-coupling coefficients between the LP01 mode and the LP11 mode. From this fact, mode-coupling between the LP01 mode and the LP21 mode can also be suppressed when the radius $R_{re}$ of the doped region 22 is set to satisfy the above formula (3).

Figure 5A:
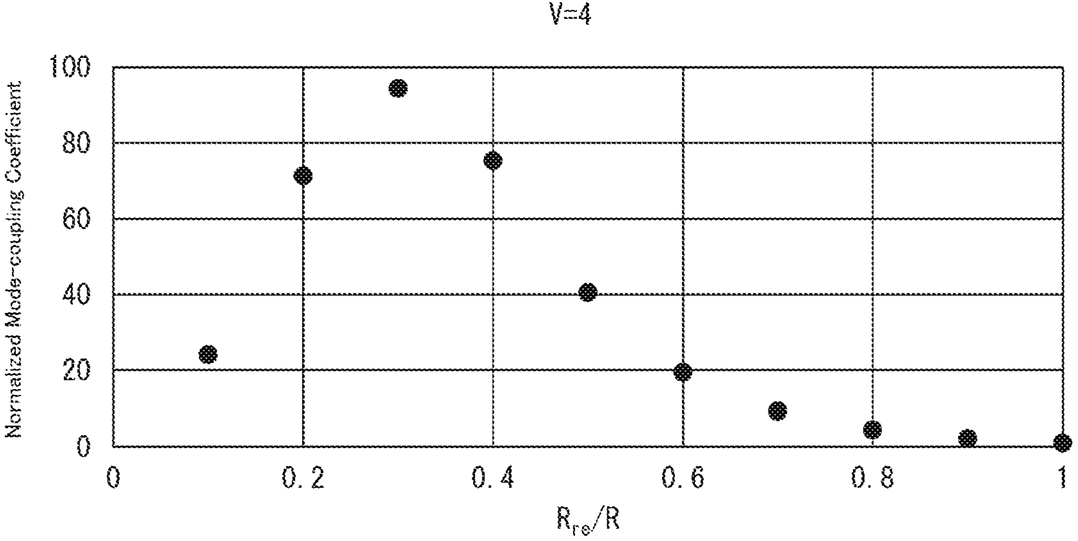
FIG. 5A is a graph showing a relationship between a doped region of a rare-earth element and a normalized mode-coupling coefficient between an LP01 mode and an LP02 mode in a case where a normalized frequency V of an optical fiber is 4.
Figure 5B:
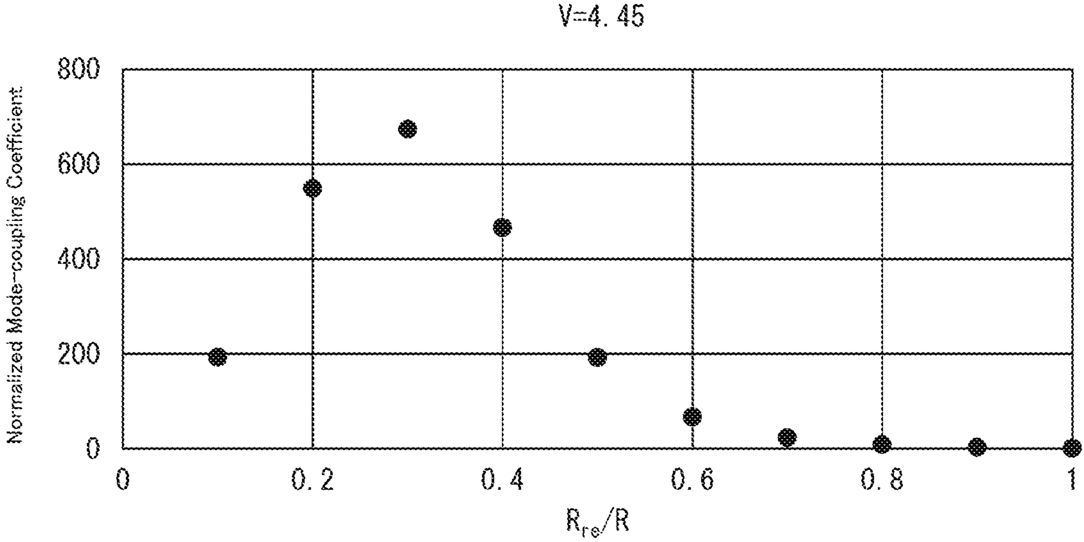
FIG. 5B is a graph showing a relationship between a doped region of a rare-earth element and a normalized mode-coupling coefficient between an LP01 mode and an LP02 mode in a case where a normalized frequency V of an optical fiber is 4.45.

Furthermore, normalized mode-coupling coefficients between the LP01 mode and the LP02 mode are calculated as shown in FIGS. 5A and 5B. FIG. 5A shows normalized mode-coupling coefficients where V=4, and FIG. 5B shows normalized mode-coupling coefficients where V=4.45. As seen from FIGS. 5A and 5B, when the radius $R_{re}$ of doped region 22 is smaller than the radius R of the core 20, normalized mode-coupling coefficients between the LP01 mode and the LP02 mode are greater than those in a case where a rare-earth element has been doped to the entire region of the core 20. Therefore, the inventors attempted to adjust a normalized frequency V of the rare-earth doped fiber 10, rather than a radius $R_{re}$ of the doped region 22, to suppress mode-coupling between the LP01 mode and the LP02 mode.

Generally, a rare-earth doped fiber used in a fiber laser apparatus has an overall length ranging from several meters to several tens of meters. This rare-earth doped fiber is wound in a coiled manner and housed in a housing. Generally, the LP21 mode and the LP02 mode can propagate if a normalized frequency V exceed 3.9. When a normalized frequency V of a rare-earth doped fiber is lowered, a transmission loss of the LP02 mode increases, so that no LP02 mode substantially propagates in a rare-earth doped fiber.

Figure 6:
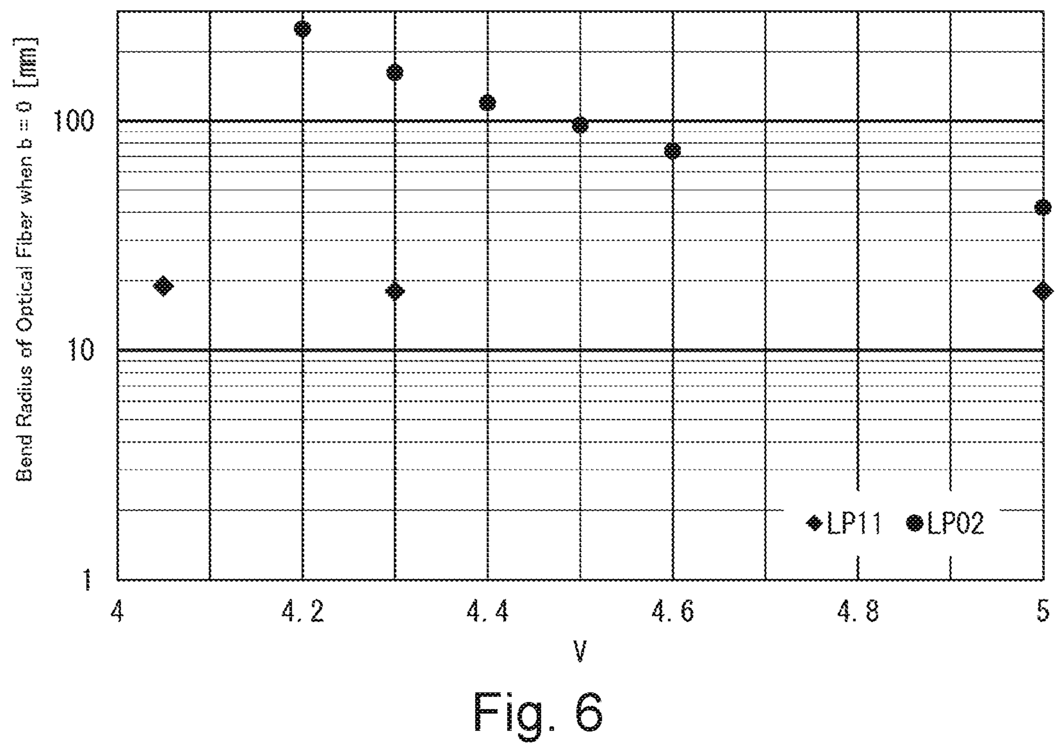
FIG. 6 is a graph showing a bend radius of an optical fiber when normalized propagation constants b of an LP11 mode and an LP02 mode become 0 at respective normalized frequencies V.

FIG. 6 shows bend radii of an optical fiber when a normalized propagation constant b of the LP11 mode and the LP02 mode is 0 for normalized frequencies V. A normalized propagation constant b of 0 means that the mode cannot propagate through a core. For example, in a case where V=4.5, the LP02 mode cannot propagate through an optical fiber bent with a diameter of about 100 mm or less. Furthermore, in a case where V=4.2, the LP02 mode cannot propagate through an optical fiber bent with a diameter of about 200 mm or less.

Therefore, when light transmits through a long-period grating produced by a TMI phenomenon, mode-coupling between the LP01 mode and the LP11 mode propagating through the core 20, mode-coupling between the LP01 mode and the LP21 mode propagating through the core 20, and mode-coupling between the LP01 mode and the LP02 mode propagating through the core 20 can respectively be suppressed if a normalized frequency V of the rare-earth doped fiber 10 for an operating frequency (oscillation frequency) is set to be 4.5 or less, or 4.2 or less while a radius $R_{re}$ of the doped region 22 is set to satisfy the above formula (3). Thus, degradation of beam quality can be suppressed.

Meanwhile, the amount of pumping light absorbed in a rare-earth doped fiber is in proportion to a product of the amount of a rare-earth element included in a cross-section of the rare-earth doped fiber and a length of the rare-earth doped fiber. Therefore, if a length of a rare-earth doped fiber 10 required to absorb a predetermined amount of pumping light in a case where a rare-earth element has been doped to the entire region of a core 20 is defined by L, then a length L' of a rare-earth doped fiber 10 required to absorb the same amount of pumping light in a case where a rare-earth element has been doped to a doped region 22 ranging from the center of a core 20 to a radius $R_{re}$ is expressed by the following formula (4).

$$L' = \left(\frac{R}{R_{re}}\right)^2 L \tag{4}$$

It can be seen from this formula (4) that the overall length of a rare-earth doped fiber 10 needs to be increased in order to absorb pumping light sufficiently if a radius $R_{re}$ of a doped region 22 to which a rare-earth element has been doped is made excessively small. When the overall length of a rare-earth doped fiber 10 is increased, stimulated Raman scattering is likely to occur, so that the effect of enlarging a core 20 is reduced.

Figure 7:
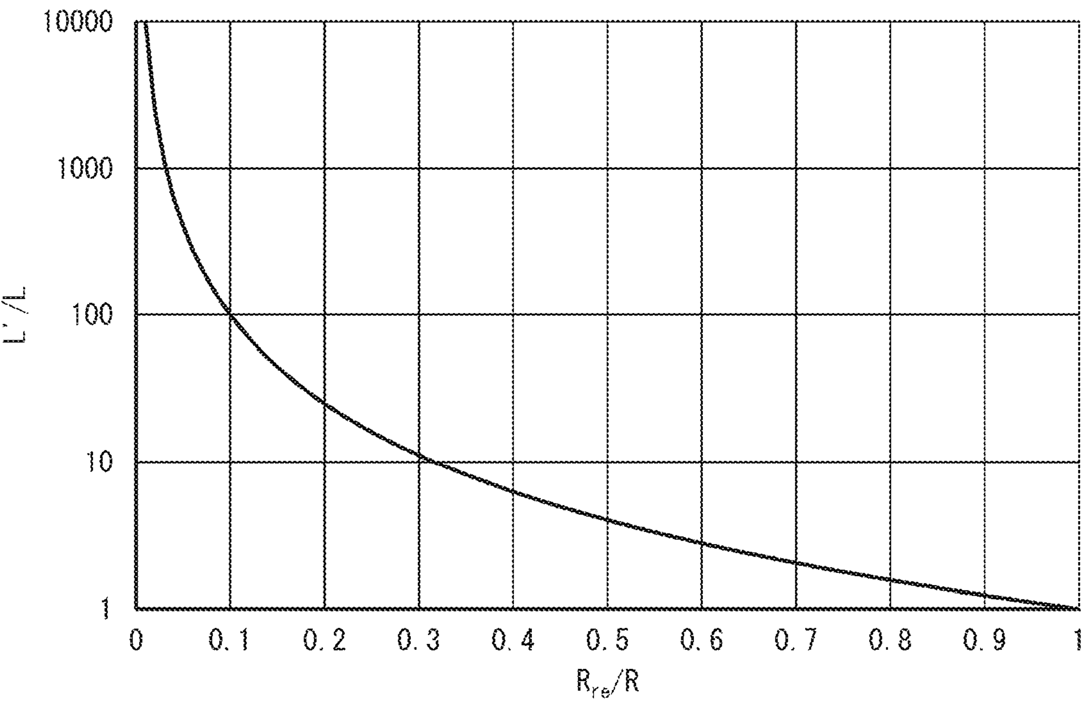
FIG. 7 is a graph showing a relationship between a required length L' of a rare-earth doped fiber and a radius $R_{re}$ of a doped region.

Now the relationship between the aforementioned length L' of the rare-earth doped fiber 10 and the radius $R_{re}$ of the doped region will be examined. FIG. 7 is a graph showing the relationship between $R_{re}/R$ and L'/L. As shown in FIG. 7, if $R_{re} \geq 0.1$ R, a required length L' of the rare-earth doped fiber 10 can be made less than or equal to 100 times a length L of the rare-earth doped fiber 10 required in a case where a rare-earth element has been doped to the entire region of the core 20. Furthermore, if $R_{re} \geq 0.3$ R, a required length L' of the rare-earth doped fiber 10 can be made less than or equal to about 10 times a length L of the rare-earth doped fiber 10 required in a case where a rare-earth element has been doped to the entire region of the core 20. Therefore, it is provided that $0.1\ R < R_{re}$, or $0.3\ R < R_{re}$, in order to prevent the rare-earth doped fiber 10 from being excessively long.

Meanwhile, a normalized frequency V of an optical fiber is defined by the following formula (5). A normalized frequency V of the rare-earth doped fiber 10 used in one or more embodiments is 2.4 or more.

$$V = \frac{2\pi}{\lambda} R n_1 \sqrt{2\Delta} \tag{5}$$

Here, λ is an operating wavelength of the optical fiber (oscillation wavelength of laser), $n_1$ is a refractive index of the core, $n_2$ is a refractive index of a cladding, and Δ is a relative refractive index difference between the core and the cladding.

A relative refractive index difference is defined by the following formula (6).

$$\Delta = \frac{n_1^2 - n_2^2}{2n_1^2} \tag{6}$$

It can be seen from the formulas (5) and (6) that a radius R of a core needs to be reduced or a relative refractive index difference Δ between a core and a cladding needs to be reduced in order to make a normalized frequency V of an optical fiber less than or equal to a certain degree. If a relative refractive index difference Δ between a core and a cladding is excessively reduced, the optical confinement effect to the core is reduced, so that mode-coupling is more likely to be caused by a slight disturbance even with an optical power that is less than or equal to a threshold at which the TMI phenomenon occurs. The inventors have discovered that, when a radius R of a core 20 of a rare-earth doped fiber 10 is reduced, for example, such that R [μm] ≤V/0.34, a normalized frequency V can be reduced with the optical confinement effect to the core 20.

Figure 8:
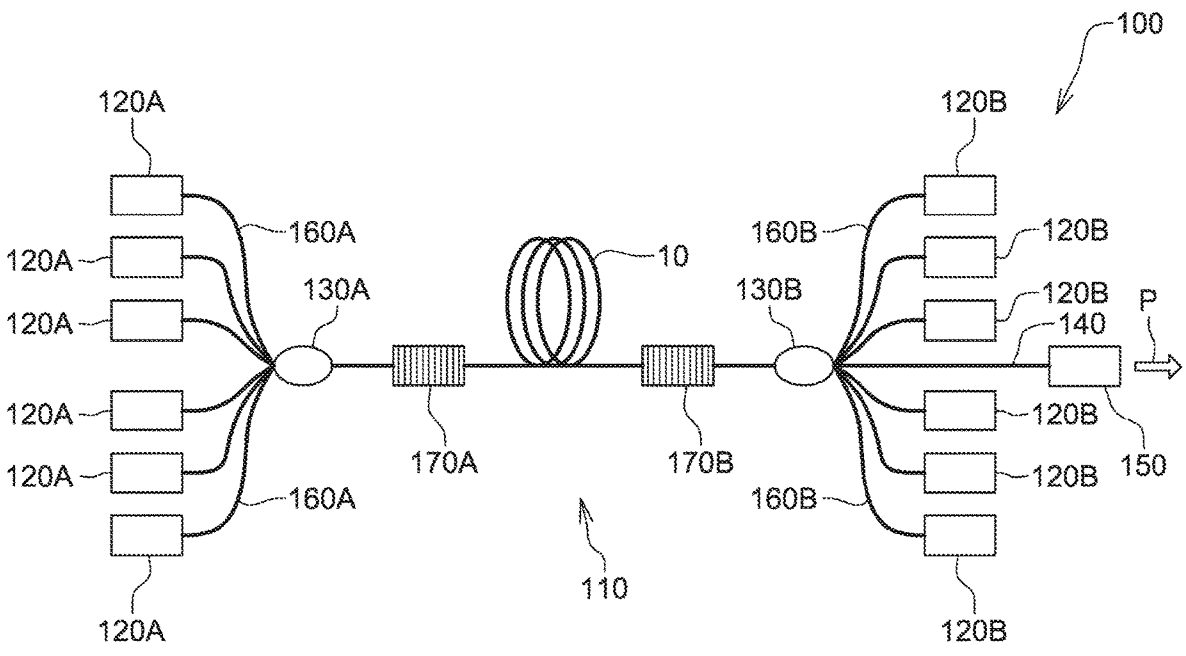
FIG. 8 is a block diagram schematically showing an arrangement of a fiber laser apparatus according to one or more embodiments of the present invention.

Now one or more embodiments of a fiber laser apparatus using the aforementioned rare-earth doped fiber 10 will be described. FIG. 8 is a block diagram schematically showing an arrangement of a fiber laser apparatus 100 using the aforementioned rare-earth doped fiber 10. As shown in FIG. 8, the fiber laser apparatus 100 has an optical cavity 110 including the aforementioned rare-earth doped fiber 10 as an amplification optical fiber that can amplify a laser beam, a plurality of forward pumping light sources 120A operable to provide pumping light to the optical cavity 110 from one side (front side) of the optical cavity 110, a plurality of backward pumping light sources 120B operable to provide pumping light to the optical cavity 110 from the other side (back side) of the optical cavity 110, a forward optical combiner 130A operable to combine pumping light outputted from the forward pumping light sources 120A and provide the combined pumping light to the optical cavity 110, a backward optical combiner 130B operable to combine pumping light outputted from the backward pumping light sources 120B and provide the combined pumping light to the optical cavity 110, a delivery fiber 140 extending from the backward optical combiner 130B, and a laser output portion 150 provided on a downstream end of the delivery fiber 140. Each of the forward pumping light sources 120A is connected to the forward optical combiner 130A by an optical fiber 160A. Each of the backward pumping light sources 120B is connected to the backward optical combiner 130B by an optical fiber 160B.

The optical cavity 110 includes a high-reflectivity portion 170A that reflects light having a certain oscillation wavelength (e.g., 1070 nm) at a high reflectivity and a low-reflectivity portion 170B that reflects light having that wavelength at a reflectivity lower than that of the high-reflectivity portion 170A. For example, each of the high-reflectivity portion 170A and the low-reflectivity portion 170B is formed of a fiber Bragg grating (FBG) or a mirror in which an optical fiber has a refractive index varying in a periodical manner along a propagation direction of light. In the example illustrated in FIG. 8, each of the high-reflectivity portion 170A and the low-reflectivity portion 170B is formed of a fiber Bragg grating.

Each of the optical fibers 160A and 160B connected to the pumping light sources 120A and 120B has a core and a cladding that surrounds a circumference of the core with a refractive index lower than a refractive index of the core. Interiors of the cores of the optical fibers 160A and 160B form optical waveguides through which pumping light generated by the pumping light sources 120A and 120B propagates.

For example, a laser module including high-power multimode semiconductor laser devices capable of emitting a laser beam having a wavelength of 975 nm may be used for the pumping light sources 120A and 120B. Pumping light generated by the respective forward pumping light sources 120A propagates through the core of the optical fiber 160A to the forward optical combiner 130A, where the beams of the pumping light are combined and provided to the optical cavity 110. Pumping light generated by the respective backward pumping light sources 120B propagates through the core of the optical fiber 160B to the backward optical combiner 130B, where the beams of the pumping light are combined and provided to the optical cavity 110. The pumping light generated by the forward pumping light sources 120A and the pumping light generated by the backward pumping light sources 120B may have the same wavelength or different wavelengths.

The pumping light provided to the optical cavity 110 from the pumping light sources 120A and 120B through the optical combiners 130A and 130B, respectively, propagates within the inner cladding 30 and the core 20 of the rare-earth doped fiber 10. The pumping light is absorbed to rare-earth ions while it passes across the doped region 22 of the core 20, so that the rare earth ions are excited to produce spontaneous emission. The spontaneous emission is recursively reflected between the high-reflectivity portion 170A and the low-reflectivity portion 170B, so that light having a specific wavelength (e.g., 1070 nm) is amplified to cause laser oscillation. The laser beam thus amplified by the optical cavity 110 propagates through the core 20 of the rare-earth doped fiber 10. A portion of the laser beam transmits through the low-reflectivity portion 170B. The laser beam that has transmitted through the low-reflectivity portion 170B is provided to the core of the delivery fiber 140 from the backward optical combiner 130B. Then the laser beam propagates through the core of the delivery fiber 140, so that the laser beam is emitted as an output laser beam P from the laser output portion 150, for example, toward a workpiece as shown in FIG. 8.

As an example, the core 20 of the rare-earth doped fiber 10 has a radius R of 9.25 μm and a refractive index of 1.4523. Furthermore, the inner cladding 30 has a refractive index of 1.45. A relative refractive index difference Δ between the core 20 and the inner cladding 30 is 0.16%. The normalized frequency V of this rare-earth doped fiber 10 is calculated from the above formula (5) as V=4.44. The rare-earth doped fiber 10 has an overall length of 15 m and a bend radius of 100 mm. Ytterbium has been doped to the doped region 22 of the core 20. The doped region 22 has a radius $R_{re}$ of 5.5 μm. In this example, the above formula (3) is expressed as $0<R_{re}<5.97$ μm. Therefore, the formula (3) has been met. Furthermore, because 0.3 R=2.78 μm, the inequality $0.3\ R<R_{re}$ has been met.

Since the rare-earth doped fiber 10 has a bend radius of 100 mm, an LP02 mode cannot propagate through the core 20 of the rare-earth doped fiber 10 as described above. Thus, an LP01 mode, an LP11 mode, and an LP21 mode can propagate through the core 20. In this case, a normalized mode-coupling coefficient between the LP01 mode, which is the fundamental mode, and the LP11 mode is 0.98, whereas a normalized mode-coupling coefficient between the LP01 mode and the LP21 mode is 0.96. Therefore, when the rare-earth doped fiber 10 is used as an amplification optical fiber, coupling from the LP01 mode to the LP11 mode and coupling from the LP01 mode to the LP21 mode can respectively be suppressed as compared to a case where a rare-earth element is doped to the entire region of the core 20. Thus, degradation of beam quality of the output laser beam P outputted from the laser output portion 150 can be suppressed.

In the example illustrated in FIG. 8, the pumping light sources 120A and 120B and the optical combiners 130A and 130B are provided on both sides of the optical cavity 110 so as to form a bidirectional pumping fiber laser apparatus. However, one or more pumping light sources and an optical combiner may be provided only on one side of the optical cavity 110. As a fiber laser apparatus, there has been known a MOPA fiber laser apparatus that amplifies seed light from a seed light source with use of pumping light from a pumping light source. The aforementioned rare-earth doped fiber 10 can be used as an amplification optical fiber in such a MOPA fiber laser apparatus.

As described above, according to one or more embodiments of the present invention, there is provided a rare-earth doped fiber capable of suppressing mode-coupling between the fundamental mode and a higher-order mode when light transmits through a long-period grating produced by a TMI phenomenon. This rare-earth doped fiber has a core having a radius R and a cladding surrounding a circumference of the core and having a refractive index lower than a refractive index of the core. A rare-earth element has been doped to a doped region ranging from a center of the core to a radius $R_{re}$. A normalized frequency V of the rare-earth doped fiber at an operating wavelength is greater than or equal to 2.4 and less than or equal to 4.5, and $0<R_{re}<(0.0247V^2-0.3353V+1.6474)R$.

According to such a rare-earth doped fiber, a mode-coupling coefficient between the fundamental mode and a higher-order mode propagating through a core can be reduced. Therefore, mode-coupling between the fundamental mode and the higher-order mode can be suppressed when light transmits through a long-period grating produced by a TMI phenomenon.

In one or more embodiments, $0.1\ R<R_{re}<(0.0247V^2-0.3353V+1.6474)R$. When the radius $R_{re}$ of the doped region is made greater than 0.1 R, mode-coupling between the fundamental mode and the higher-order mode can be suppressed without excessively lengthening the rare-earth doped fiber. Furthermore, when $0.3\ R<R_{re}<(0.0247V_2-0.3353V+1.6474)R$, mode-coupling between the fundamental mode and the higher-order mode can be suppressed while the length of the rare-earth doped fiber is further reduced.

The normalized frequency V may be greater than or equal to 2.4 and less than or equal to 4.2. Within this range of the normalized frequency V, an LP02 mode becomes unlikely to propagate through the core of the rare-earth doped fiber. Therefore, mode-coupling between the fundamental mode and the LP02 mode can be suppressed. Furthermore, the normalized frequency V may be greater than or equal to 2.4 and less than or equal to 3.9. Within this range of the normalized frequency V, the LP02 mode hardly propagates or does not propagate through the core of the rare-earth doped fiber. Therefore, mode-coupling between the fundamental mode and the LP02 mode can substantially be eliminated.

The radius R of the core may be less than or equal to V/0.34 [μm]. When the radius R of the core is made less than or equal to V/0.34 [μm], the normalized frequency V can be reduced without excessively lowering a refractive index of the core.

Ytterbium may be used as the rare-earth element. When ytterbium is used as the rare-earth element, the rare-earth doped fiber can be used in a fiber laser apparatus for material processing.

According to one or more embodiments of the present invention, there is provided a fiber laser apparatus capable of suppressing degradation of beam quality of an output laser beam. This fiber laser apparatus has the aforementioned rare-earth doped fiber and at least one pumping light source operable to generate pumping light for exciting the rare-earth element doped to the rare-earth doped fiber and provide the pumping light to the rare-earth doped fiber.

According to such a fiber laser apparatus, mode-coupling between the fundamental mode and a higher-order mode can be suppressed in a rare-earth doped fiber. Therefore, degradation of beam quality of an output laser beam can be suppressed, and a high-power laser beam can be outputted while maintaining light focusing capability.

At least a portion of the rare-earth doped fiber may be bent with a bend radius of 200 mm or less, or 100 mm or less. When at least a portion of the rare-earth doped fiber is thus bent, the amount of an LP02 mode propagating through the core of the rare-earth doped fiber can be reduced. Therefore, mode-coupling between the fundamental mode and the LP02 mode can be suppressed.

Although one or more embodiments of the present invention have been described, the present invention is not limited to the aforementioned embodiments. It should be understood that various different forms may be applied to the present invention within the technical idea thereof. Those skilled in the art, having benefit of this disclosure, will appreciate that various other embodiments may be devised without departing from the scope of the present invention. Accordingly, the scope of the invention should be limited only by the attached claims.

The present invention is suitably used for a rare-earth doped fiber used in a fiber laser apparatus.

DESCRIPTION OF REFERENCE NUMERALS AND SIGNS

10 Rare-earth doped fiber
20 Core
22 Doped region
24 Non-doped region
30 Inner cladding
40 Outer cladding
100 Fiber laser apparatus
110 Optical cavity
120A, 120B Pumping light source
130A, 130B Optical combiner
140 Delivery fiber
150 Laser output portion
170A High-reflectivity portion
170B Low-reflectivity portion

The invention claimed is:

1. A rare-earth doped fiber comprising:

a core having a radius R and comprising a doped region to which a rare-earth element has been doped, the doped region ranging from a center of the core to a radius $R_{re}$; and a cladding surrounding a circumference of the core and having a refractive index lower than a refractive index of the core, wherein a normalized frequency V at an operating wavelength is greater than or equal to 2.4 and less than or equal to 4.5, and the radius $R_{re}$ is in a range of $0<R_{re}<(0.0247V^2-0.3353V+1.6474)$ R.

2. The rare-earth doped fiber as recited in claim 1, wherein the radius $R_{re}$ is in a range of $0.1R<R_{re}<(0.0247V^2-0.3353V+1.6474)$ R.

3. The rare-earth doped fiber as recited in claim 2, wherein the radius $R_{re}$ is in a range of $0.3R<R_{re}<(0.0247V^2-0.3353V+1.6474)$ R.

4. The rare-earth doped fiber as recited in claim 1, wherein the normalized frequency V is greater than or equal to 2.4 and less than or equal to 4.2.

5. The rare-earth doped fiber as recited in claim 4, wherein the normalized frequency V is greater than or equal to 2.4 and less than or equal to 3.9.

6. The rare-earth doped fiber as recited in claim 1, wherein the radius R of the core is less than or equal to V/0.34 μm.

7. The rare-earth doped fiber as recited in claim 1, wherein the rare-earth element is ytterbium.

8. A fiber laser apparatus comprising:

the rare-earth doped fiber as recited in claim 1; and at least one pumping light source operable to generate a pumping light for exciting the rare-earth element doped to the rare-earth doped fiber and provide the pumping light to the rare-earth doped fiber.

9. The fiber laser apparatus as recited in claim 8, wherein at least a portion of the rare-earth doped fiber is bent with a bend radius of 200 mm or less.

10. The fiber laser apparatus as recited in claim 9, wherein at least a portion of the rare-earth doped fiber is bent with a bend radius of 100 mm or less.

* * * * *